March 18, 1947. C. M. OSTERHELD 2,417,778
THERMAL RELUCTANCE ROD THERMAL-RETARDER FOR ELECTRIC WATER HEATERS
Filed Aug. 27, 1945 2 Sheets-Sheet 1
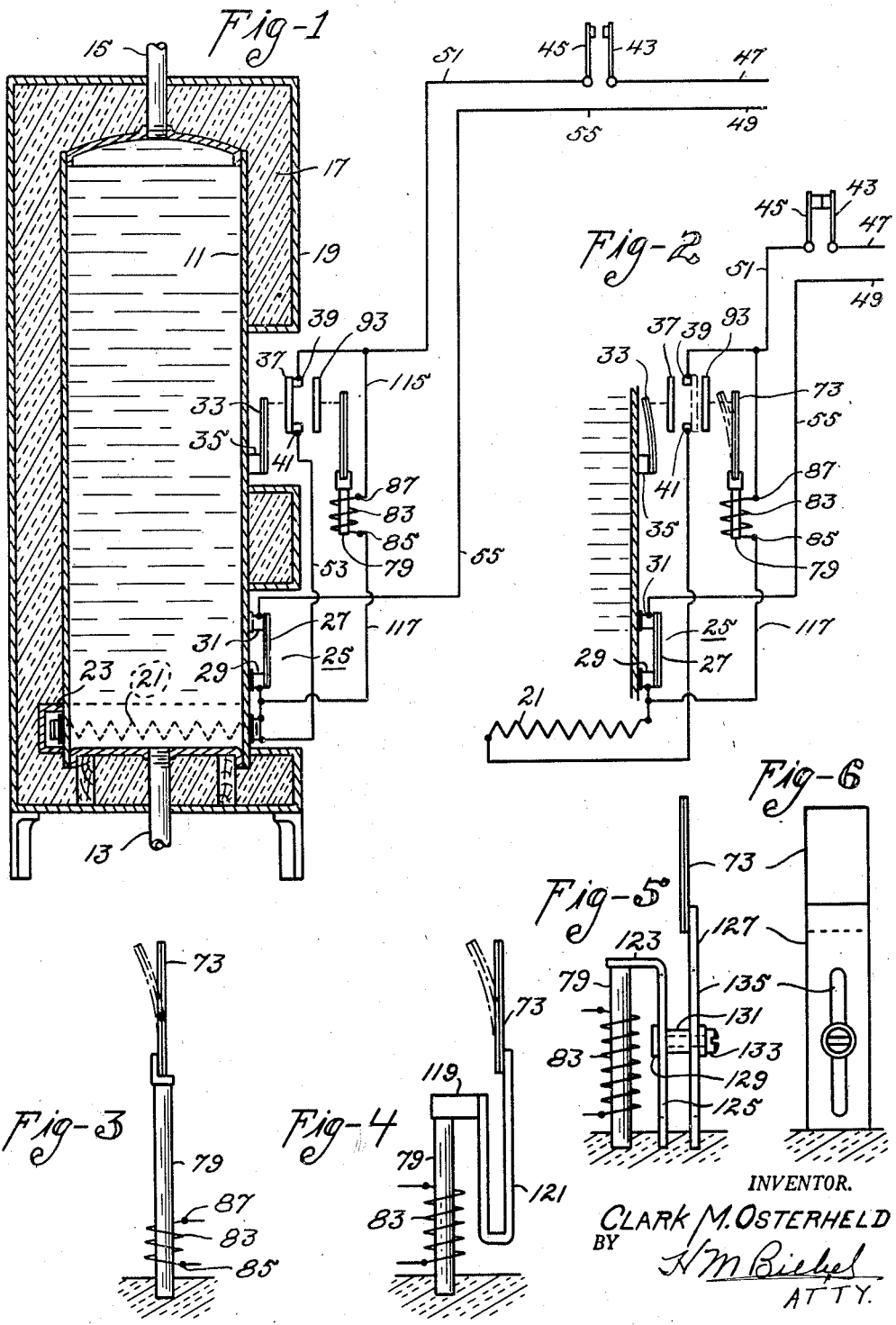
INVENTOR.
CLARK M. OSTERHELD
BY
H. M. Bickel
ATTY.

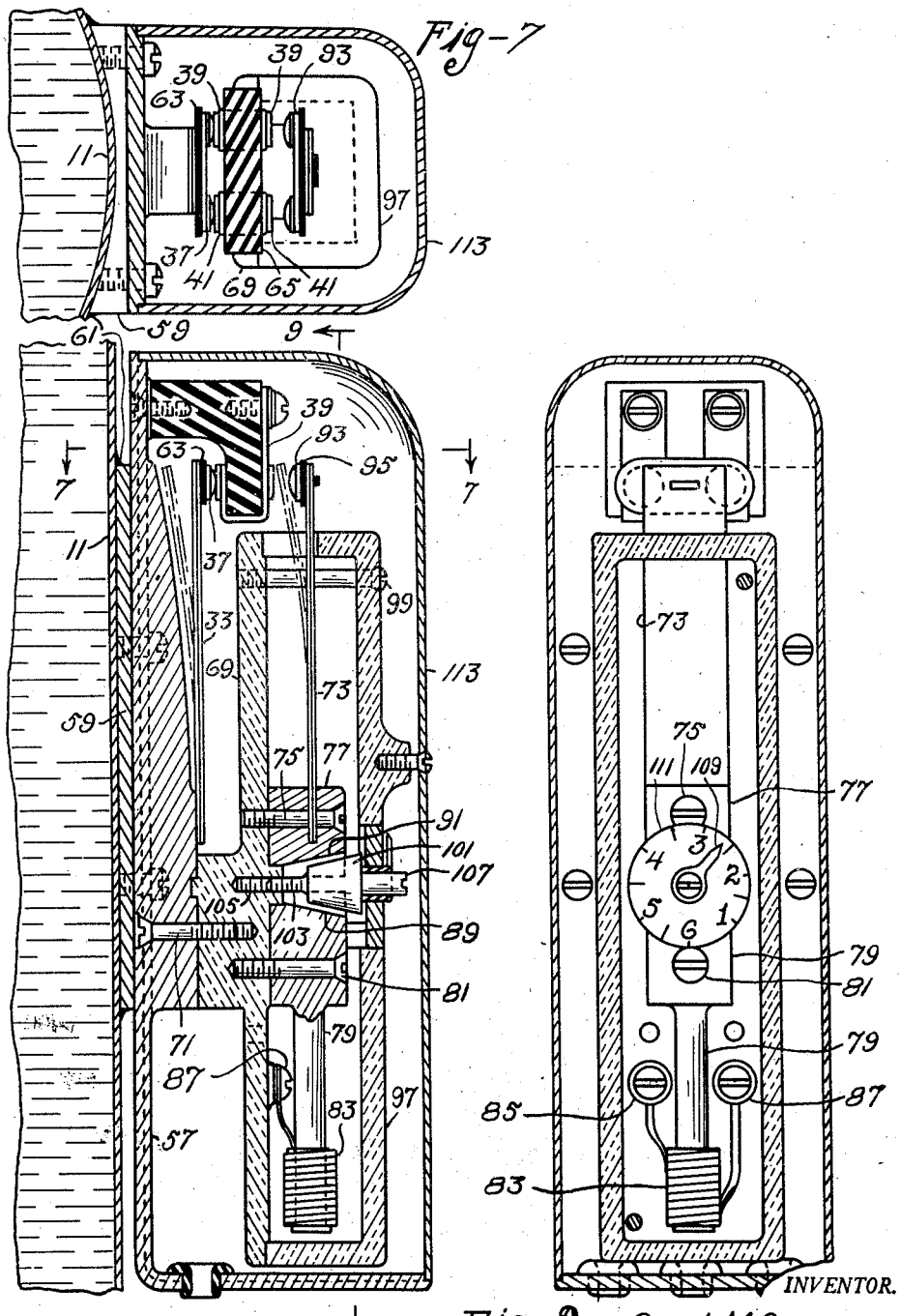

Patented Mar. 18, 1947

2,417,778

UNITED STATES PATENT OFFICE 2,417,778

THERMAL RELUCTANCE ROD THERMAL-RETARDER FOR ELECTRIC WATER HEATERS

Clark M. Osterheld, Stroughton, Wis., assignor to McGraw Electric Company, Elgin, Ill., a corporation of Delaware Application August 27, 1945, Serial No. 612,890

5 Claims. (Cl. 219—39)

My invention relates to electric heating and particularly to control systems for electric heaters of domestic hot water tanks.

An object of my invention is to provide a relatively simple form of thermal retarder for the single electric heater of a domestic hot water tank that shall be effective to cause energization of the heater immediately upon closure of a time-controlled switch, or that shall cause energization of such heater with a predetermined time delay period after closure of a time-controlled switch.

Other objects of my invention will either be apparent from a description of several forms of device embodying my invention or will be pointed out in the course of such description and set forth particularly in the appended claims.

In the drawings,

Figure 1 is a vertical sectional view of a domestic hot water tank having adapted thereto the elements of my invention shown in diagram as when the tank is full of cold water and the time switch is open, Fig. 2 is a view in diagram of the thermal elements of Fig. 1, except that the position of these elements and the electric contacts are such as when the upper portion of the tank contains hot water and the lower portion contains cold water and with the time controlled switch just closed, Fig. 3 shows schematically one type of a heat reluctance path, Fig. 4 is a modification of the device shown in Fig. 3 in which the heating coil may be larger and the heat path longer, Fig. 5 is a modification of Fig. 4 in that the length of the heat flow path may be varied so as to produce a variable time delay, Fig. 6 is a front view of the parts shown in Fig. 5, Fig. 7 is a horizontal sectional view on the line 7—7 of Fig. 8, Fig. 8 is a vertical sectional view of a thermal retarder embodying my invention mounted on the outside of the tank, the retarder comprising the elements of Figs. 3, or 4, or 5 and 6, and, Fig. 9 is a vertical sectional view taken on the line 9—9 of Fig. 8.

Referring first of all to Fig. 1 of the drawings, I have there illustrated a standard domestic hot water tank 11 which is provided with a lower cold water inlet pipe 13 and with an upper hot water outlet pipe 15. The tank 11 is surrounded by a mass 17 of heat insulation which is held in proper operative position relatively to the tank 11 by an outer casing 19.

I provide preferably, but not necessarily, a single electric heater 21, which if only a single heater is provided is preferably positioned adjacent to the lower end of tank 11 and which may be positioned in a tunnel 23 all in a manner now well-known in the art.

I provide a lower thermally-actuable heater control switch 25 which may comprise a bimetal bar 27, the lower end of which is fixedly secured to a fixed contact 29 while its upper end is adapted to engage with and be disengaged from a second fixed contact 31. While I have illustrated and described a particular form of lower thermally-actuable heater control switch 25, I do not desire to be limited thereto since any form of switch effective for the same purpose as is switch 25 may be used in place thereof. The design, construction and adjustment of switch 25 is such that bimetal bar 27 will be in engagement with fixed contact 31 when it is subject to cold water in the tank and bimetal bar 27 will be out of engagement with fixed contact 31 when subject to hot water in the tank. By cold water I mean water the temperature of which is on the order of 70° to say, 130° F. and by hot water I mean water the temperature of which is on the order of 150° F.

I provide an upper thermally-actuable switch comprising a bimetal bar 33, the lower end portion of which is adapted to be mounted against a fixed contact 35 subject to the temperature of the water in the intermediate portion of the tank. The upper end portion of bimetal bar 33 is mechanically connected with a contact bridging member 37 and when bimetal bar 33 is subject to cold water in the tank, contact bridging member 37 will be in engagement with two fixedly supported contacts 39 and 41. When bimetal bar 33 is subject to hot water in the tank, it will flex so that contact bridging member 37 will be moved out of engagement with fixed contacts 39 and 41.

All of the parts thus far described are already old and well-known in the art. I provide further a time-controlled switch comprising contact arms 43 and 45 which contact arms are actuated by a time measuring clock or other similar device so that they will be in engagement with each other during off-peak periods and will be out of engagement with each other during on-peak periods of each twenty-four-hour day.

I provide a pair of supply circuit conductors 47 and 49 of which conductor 47 may be connected with contact arm 43. Contact arm 45 is connected by a conductor 51 to fixed contact 39. Fixed contact 41 may be connected by a conductor 53 with one terminal of heater 21, the other terminal of which may be connected to fixed contact 29. Fixed contact 31 is connected by a conductor 55 to the second supply circuit conductor 49.

It is evident that if the upper bimetal bar 33 is subject to the temperature of cold water in the tank and if the contact bars 43 and 45 are moved into engagement with each other as at the start of an off-peak period, contact bridging member 37 will be in engagement with fixed contacts 39 and 41 whereby energization of heater 21 is effected through a circuit substantially as follows: from supply circuit conductor 47, through engaged contact arms 43 and 45, through conductor 51, through contact bridging member 37 and contacts 39 and 41, through conductor 53, heater 21, through the closed switch 25 and from there through conductor 55 to the second supply circuit conductor 49. This will mean, therefore, that energization of heater 21 will be affected immediately upon closure of the time controlled switch which will occur at the start of an off-peak period.

Referring now to Figs. 7, 8 and 9, I have there illustrated in detail one form of device embodying my invention. The thermal retarder structure is adapted to be mounted on a support 57 of heat-conducting material, the general outline of which is L-shaped and which is secured against a supporting block 59, the inner surface of which has substantially the same contour as the outer surface of the tank 11. I may secure supporting block 59, which is also made of heat-conducting material against the outer surface of tank 11 by welding seams 61. The bimetal bar 33 is adapted to be secured against the front surface of support 57 and is adapted to carry the contact bridging member 37 at its upper end, a plate 63 of electric insulating material being positioned between the bridging member 37 and bimetal bar 33.

Fig. 8 shows the position of bimetal bar 33 when it is subject to cold water in the tank 11 so that contact bridging member 37 is in contacting engagement with the contacts 39 and 41 which may be supported on a block 65 which is of substantially L-shape and is secured against member 57 as by one or more short machine screws.

I provide a support 69 of heat- and electric-insulating material which is of substantially elongated form and which may be held against the front surface of member 57 as by one or more machine screws 71. I support a second bimetal bar 73 at its lower end against the front surface of member 69 as by a machine screw 75 which extends through a block 77 of heat-conducting material of relatively high thermal reluctance. I provide further a rod-like lower member 79 which is also secured against the front surface of member 69 as by a machine screw 81. On the lower end of member 79 I mount a heating coil 83, the two terminals of which are adapted to be connected to fixed contacts 85 and 87 mounted on member 69. The upper end of rod-like member 79 is made substantially rectangular in section and is provided with an arcuate depression 89 therein. The upper end portion of member 79 is a counterpart of member 77, and is provided with an arcuate depression 91 in its lower surface.

Bimetal bar 73 is provided with a contact bridging member 93 which is insulatedly mounted against the upper end of bimetal bar 73, a small plate 95 of electric insulating material being positioned therebetween.

I provide a heat insulating cover 97 for member 69 and I may hold this cover in place by a plurality of machine screws 99.

I provide a means for adjustably varying the thermal reluctance for the heat flow path from coil 83 to bimetal bar 73 in the form of a conical member 101 which is adapted to be positioned in the opening between the two recesses 89 and 91. Means for varying the thermal reluctance of the heat flow path comprises a screw-threaded projection 103 on the inner end of member 101 which is adapted to fit into a screw-threaded opening 105 in the mid portion of member 69. Means for adjusting the member 101 comprises a stud 107 with a screw driver slot therein and means to indicate the value in convenient terms of the thermal reluctance comprises a pointer 109 mounted on stud 107 and a dial 111 beneath the pointer 109.

I provide further a cover 113 for member 57 and the parts mounted thereon. Referring to Fig. 1, terminal 87 is connected to conductor 51 by a conductor 115 while terminal 85 of the heater 83 is connected by a conductor 117 to the fixed contact 29 of the lower thermal switch 25.

Simultaneously with the energization of heater 21 upon closure of the time controlled switch comprising contact arms 43 and 45, an energizing circuit is closed through heater 83 which will be effective to cause gradual temperature rise of the rod 79, the upper end portion thereof, the member 101, member 77 and bimetal bar 73. Bimetal bar 73 will be flexed in a counter-clockwise direction with the result that after a predetermined length of time on the order of four or five hours, contact bridging member 93 will be moved into engagement with contacts 39 and 41. It is to be understood that the wattage of heater 83 is so selected that in combination with the other elements comprising particularly the heat flow path between coil 83 and bimetal bar 73, will require say four or five hours until bimetal bar 73 has flexed enough to cause engagement of contact bridging member 93 with contacts 39 and 41.

It is evident that a time delay on the order of four to five hours can be affected by proper selection of material for the heat flow path between the coil 83 and the bimetal bar 73.

This construction is shown generally in Fig. 3 of the drawings, while in Fig. 4 of the drawings, I have shown a modification of this idea. The rod 79 of high thermal reluctance has secured thereto at its upper end a lug 119 the outer end of which is connected to a U-shaped member 121 also of high thermal reluctance to the upper end of which is secured the bimetal bar 73. The member 121 will, it is evident, provide a greater thermal reluctance than that of rod 79 shown in Fig. 3 of the drawings.

Referring now to Figs. 5 and 6 of the drawings I have there shown a still further modification, which is also adjustable. The upper end of rod 79 has suitably secured thereagainst a member 123 of L-shape which has an elongated slot 125 therein. A second bar 127 is supported from bar 123 by a clamp comprising a bolt 129 having a washer 131 extending between bars 123 and 127 and which is adapted to be held by a nut 133 having screw-threaded engagement with member 129, an elongated slot 135 being provided in member 127. It is thus possible to vary the thermal reluctance of the heat flow path between coil 83 and bimetal bar 73 by moving of member 129 and its operatively associated elements, upwardly in order to reduce the thermal reluctance and downwardly in order to increase the thermal reluctance.

Let it now be assumed that at the start of an off-peak period only enough cold water is in the lower part of tank 11 to subject the lower thermally-actuable switch 25 thereto. The bimetal bar 83 will then have flexed to the position shown in full lines in Fig. 2 and by broken lines in Fig. 8 of the drawings so that energization of heater 21 will not occur. Instead energization of heating coil 83 will occur and will continue for a length of time on the order of say, four hours, when bimetal bar 73 will be caused to flex sufficiently in a counter-clockwise direction as shown by broken lines in Figs. 2 and 8, to cause engagement of contact bridging member 93 with fixed contacts 39 and 41 whereby the hereinbefore described energizing circuit through heater 21 will be closed. Energization of heater 21 will continue until substantially all of the water in the tank is hot when the lower thermally-actuable switch 25 will affect deenergization of heater 21.

Various modifications may be made in the device embodying my invention without departing from the spirit and scope thereof and all such modifications coming clearly within the scope of the appended claims shall be considered a part of my invention.

I claim as my invention:

1. In a thermal retarder heater control switch unit for a domestic hot water tank circuit having an electric heater, the combination with a first bimetal bar adapted to be subject to tank water temperature intermediate the ends of a tank and a pair of fixed contacts in said circuit adapted to be engaged by said bimetal bar when subject to cold water and to be disengaged therefrom when subject to hot water, of a second bimetal bar adapted to be engaged with and disengaged from said fixed contacts, a support for one end of said second bimetal bar, of relatively great length and having appreciable thermal reluctance, and an electric heating coil at the far end of said support adapted to cause flexure of said second bimetal bar into engagement with said fixed contacts with a predetermined time period of delay after energization thereof.

2. In a thermal retarder heater control switch unit for a domestic hot water tank circuit having an electric heater, the combination with a first bimetal bar adapted to be subject to tank water temperature intermediate the end of a tank and a pair of fixed contacts in said circuit adapted to be engaged by said bimetal bar when the latter is subject to cold water, to be disengaged therefrom when the latter is subject to hot water in the tank, of a second bimetal bar adapted to be engaged with and disengaged from said fixed contacts, a support of rod shape for one end of said second bimetal bar of relatively great length and an electric heating coil at the far end of said support adapted to cause heating and flexure of said second bimetal bar into engagement with said fixed contacts after a predetermined time period of delay after energization thereof.

3. In a thermal retarder heater control switch unit for a domestic hot water tank circuit having an electric heater, the combination with a first bimetal bar adapted to be subject to tank water temperature intermediate the end of a tank and a pair of fixed contacts in said circuit adapted to be engaged by said bimetal bar when the latter is subject to cold water, to be disengaged therefrom when the latter is subject to hot water in the tank, of a second bimetal bar adapted to be engaged with and disengaged from said fixed contacts, a support of rod shape for one end of said second bimetal bar of relatively high thermal reluctance and an electric heating coil at the far end of said support adapted to cause slow heating and flexure of said second bimetal bar into engagement with said fixed contacts after a predetermined time period of delay after energization of said heating coil.

4. In a thermal retarder heater control switch unit for a domestic hot water tank circuit having an electric heater, the combination with a first bimetal bar adapted to be subject to tank water temperature intermediate the end of a tank and a pair of fixed contacts in said circuit adapted to be engaged by said bimetal bar when the latter is subject to cold water, to be disengaged therefrom when the latter is subject to hot water in the tank, of a second bimetal bar adapted to be engaged with and disengaged from said fixed contacts, a support of rod shape for one end of said second bimetal bar of relatively high thermal reluctance and an electric heating coil at the far end of said support adapted to cause slow heating and flexure of said second bimetal bar into engagement with said fixed contacts after a predetermined time period of delay after energization of said heating coil, and manually-actuable means for varying the thermal reluctance.

5. In a thermal retarder heater control switch unit for a domestic hot water tank circuit having an electric heater, the combination with a first bimetal bar, a heat-conducting support for said bimetal bar adapted to be secured against a tank intermediate the ends thereof to subject said bimetal bar to tank water temperature and a pair of fixed contacts in said circuit adapted to be engaged immediately by said bimetal bar when the latter is subject to cold water and to be disengaged therefrom when the latter is subject to hot water in the tank, of a heat-insulating casing supported by said heat-conducting support, a support of substantially rod shape in said heat-insulating casing, a second bimetal bar secured at one of its ends to one of the ends of said support of rod shape, said support of rod shape being relatively long and having a relatively large thermal reluctance, a heating coil on the other end of said support of rod shape adapted to raise the temperature of said second bimetal bar and cause it to engage said fixed contacts an adjustably predetermined length of time after energization of said heating coil.

CLARK M. OSTERHELD.